US012647350B2

(12) United States Patent
Baruah et al.

(10) Patent No.: US 12,647,350 B2
(45) Date of Patent: Jun. 2, 2026

(54) TECHNIQUES FOR IMPROVING BI-DIRECTIONAL PATH SELECTION

(71) Applicant: Cisco Technology, Inc., San Jose, CA (US)

(72) Inventors: Pritam Baruah, Fremont, CA (US); Satish Mahadevan, San Ramon, CA (US); Avinash Shah, Pleasanton, CA (US); Sanjay Sreenath, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 18/608,769

(22) Filed: Mar. 18, 2024

(65) Prior Publication Data

US 2025/0202800 A1      Jun. 19, 2025

Related U.S. Application Data

(60) Provisional application No. 63/609,842, filed on Dec. 13, 2023.

(51) Int. Cl.
H04L 45/00 (2022.01)
H04L 45/12 (2022.01)
(Continued)

(52) U.S. Cl.
CPC ............ H04L 45/22 (2013.01); H04L 45/124 (2013.01); H04L 45/64 (2013.01); H04L 45/76 (2022.05)

(58) Field of Classification Search
CPC ....... H04L 45/22; H04L 45/124; H04L 45/64; H04L 45/76; H04L 45/121; H04L 45/42
See application file for complete search history.

(56) References Cited

U.S. PATENT DOCUMENTS 11,895,015 B1 *   2/2024   Budhia ................. H04L 45/24
2011/0228678 A1   9/2011   Ricciulli
(Continued)

FOREIGN PATENT DOCUMENTS

WO      WO2019147316 A1      8/2019

OTHER PUBLICATIONS

He, et al., "Enabling Application-Aware Traffic Engineering in IPV6 Networks", IEEE Network, vol. 36, No. 2, Mar. 1, 2022, pp. 42-49.
(Continued)

*Primary Examiner* — Tonia L Dollinger
*Assistant Examiner* — Joseph M Cousins
(74) *Attorney, Agent, or Firm* — Lee & Hayes, P.C.

(57) ABSTRACT

Techniques are described herein for providing bi-directional path selection based on indicated path preferences in policy data. Such techniques may be performed by a network node and may comprise generating a set of paths to a destination, a first path of the set of paths being labeled as a direct path and a second path of the set of paths being labeled as an indirect path. Such techniques may subsequently comprise receiving a communication from a source and directed to the destination, determining, based on a first indicated path preference for the destination and a second indicated path preference for the source, a path category, selecting a forwarding path as one of the first path or the second path based on the determined path category, and routing the communication to a next hop in the selected forwarding path.

20 Claims, 11 Drawing Sheets

(51) Int. Cl.
    *H04L 45/64*          (2022.01)
    *H04L 45/76*          (2022.01)

(56)                References Cited

U.S. PATENT DOCUMENTS

| | | | |
|---|---|---|---|
| 2014/0105209 A1 | 4/2014 | Mccanne | |
| 2021/0160175 A1* | 5/2021 | Gupta ................... | H04L 45/745 |
| 2022/0109620 A1 | 4/2022 | Sarcar et al. | |
| 2023/0141362 A1 | 5/2023 | Mittal | |
| 2023/0144568 A1 | 5/2023 | Means et al. | |
| 2024/0333554 A1* | 10/2024 | Mahadevan ............ | H04L 45/18 |

OTHER PUBLICATIONS

International Search Report and Written Opinion for International Application No. PCT/US2024/059190, dated Mar. 20, 2025, 13 pages.

Wang, et al., "NSV-GUARD: Constructing Secure Routing Paths in Software Defined Networking", IEEE International Conferences on Big Data and Cloud Computing, Oct. 8, 2016, pp. 293-300.

\* cited by examiner

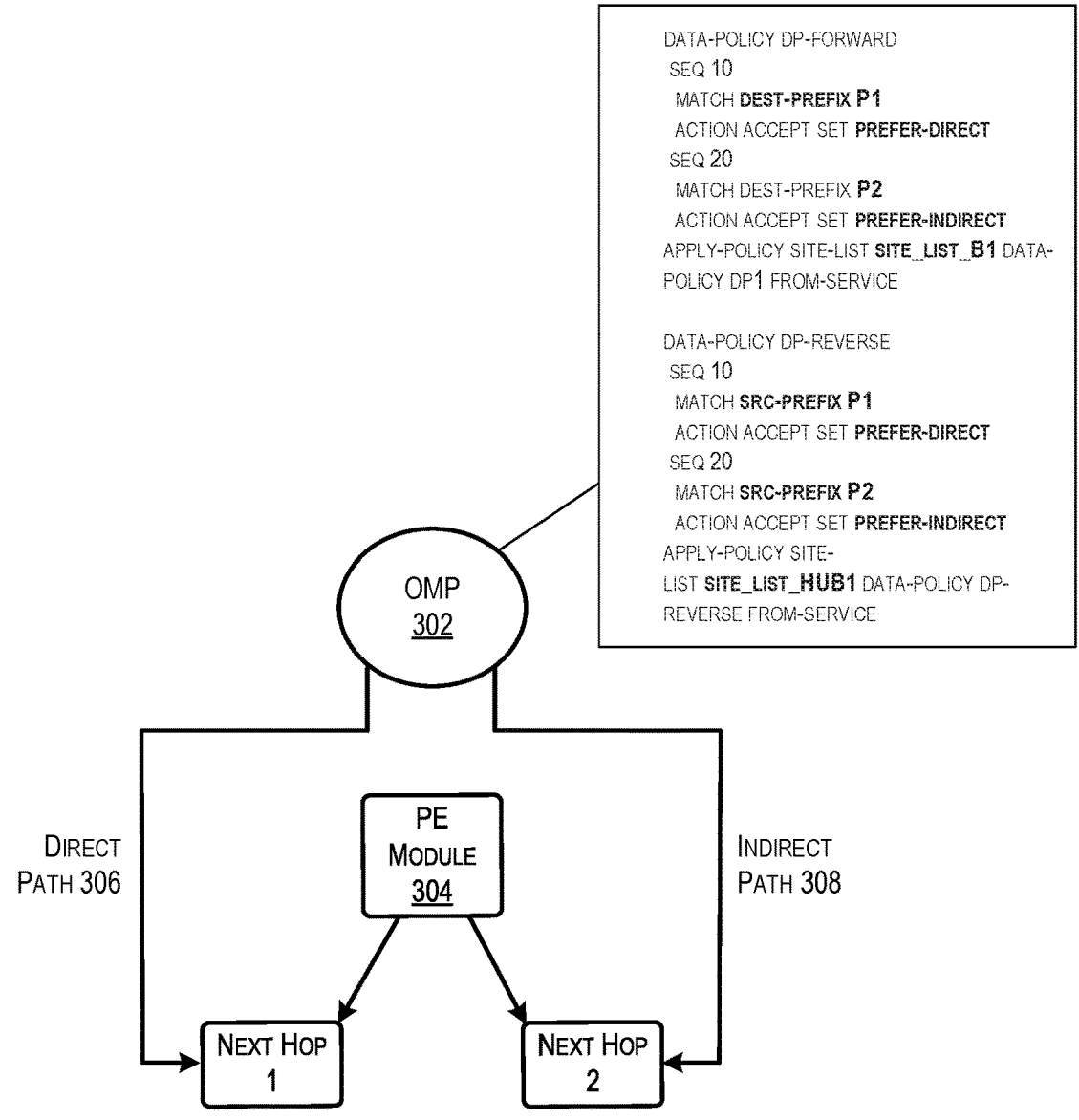

DATA-POLICY DP-FORWARD
  SEQ 10
    MATCH DEST-PREFIX P1
    ACTION ACCEPT SET PREFER-DIRECT
  SEQ 20
    MATCH DEST-PREFIX P2
    ACTION ACCEPT SET PREFER-INDIRECT
APPLY-POLICY SITE-LIST SITE_LIST_B1 DATA-POLICY DP1 FROM-SERVICE

DATA-POLICY DP-REVERSE
  SEQ 10
    MATCH SRC-PREFIX P1
    ACTION ACCEPT SET PREFER-DIRECT
  SEQ 20
    MATCH SRC-PREFIX P2
    ACTION ACCEPT SET PREFER-INDIRECT
APPLY-POLICY SITE-LIST SITE_LIST_HUB1 DATA-POLICY DP-REVERSE FROM-SERVICE

OMP
302

DIRECT PATH 306

INDIRECT PATH 308

PE MODULE 304

NEXT HOP 1

NEXT HOP 2

GENERATE A SET OF PATHS TO A DESTINATION LABELED AS DIRECT OR INDIRECT 702

RECEIVE COMMUNICATION DIRECTED TO DESTINATION 704

DETERMINE PATH CATEGORY BASED ON INDICATED PREFERENCE 706

SELECT A FORWARDING PATH BASED ON PATH CATEGORY 708

ROUTE THE COMMUNICATION TO A NEXT HOP IN THE FORWARDING PATH 710

FIG. 9

TECHNIQUES FOR IMPROVING BI-DIRECTIONAL PATH SELECTION

RELATED APPLICATION

This application claims priority to U.S. Provisional Patent Application No. 63/609,842 filed Dec. 13, 2023, the entire contents of which are incorporated herein by reference.

TECHNICAL FIELD

The present disclosure relates generally to computer networks, and more particularly, to improved path selection within a network based on requirements for an application related to a communication.

BACKGROUND

Software-defined wide area networks (SD-WANs) represent the application of software-defined networking (SDN) principles to WAN connections, such as connections using cellular networks, the Internet, and Multiprotocol Label Switching (MPLS) networks. The power of SD-WAN is the ability to provide consistent service level agreement (SLA) for important application traffic transparently across various underlying paths of varying transport quality and allow for seamless path selection based on path performance characteristics that can match application SLAs.

With the emergence of technologies such as Infrastructure as a Service (IaaS) and Software as a Service (SaaS), the resulting virtualization of services has led to a dramatic shift in the traffic loads of many large enterprises. Indeed, many SaaS services can now be reached in a typical deployment via a number of different network paths. However, path selection can also greatly impact the quality of experience (QoE) associated with a given SaaS application. For instance, delays, losses, or jitter along the routing path can lower the QoE of the SaaS application. However, the use of multiple paths can lead to a strong variation of SLA and QoE.

Today, many path routing decisions are made based on network key performance indicators (KPIs) such as a loss and latency for the network. However, path routing decisions made based on such KPIs alone may be inadequate. For example, some applications may have requirements such as SLA constraints and/or security features (e.g., firewall) that need to be applied to traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 depicts a block diagram illustrating an example of a routing setup for direct and indirect paths to be implemented in accordance with some embodiments.

FIG. 9 illustrates an example of network 800 in greater detail, according to various embodiments.

DETAILED DESCRIPTION

Overview

Figure 1:
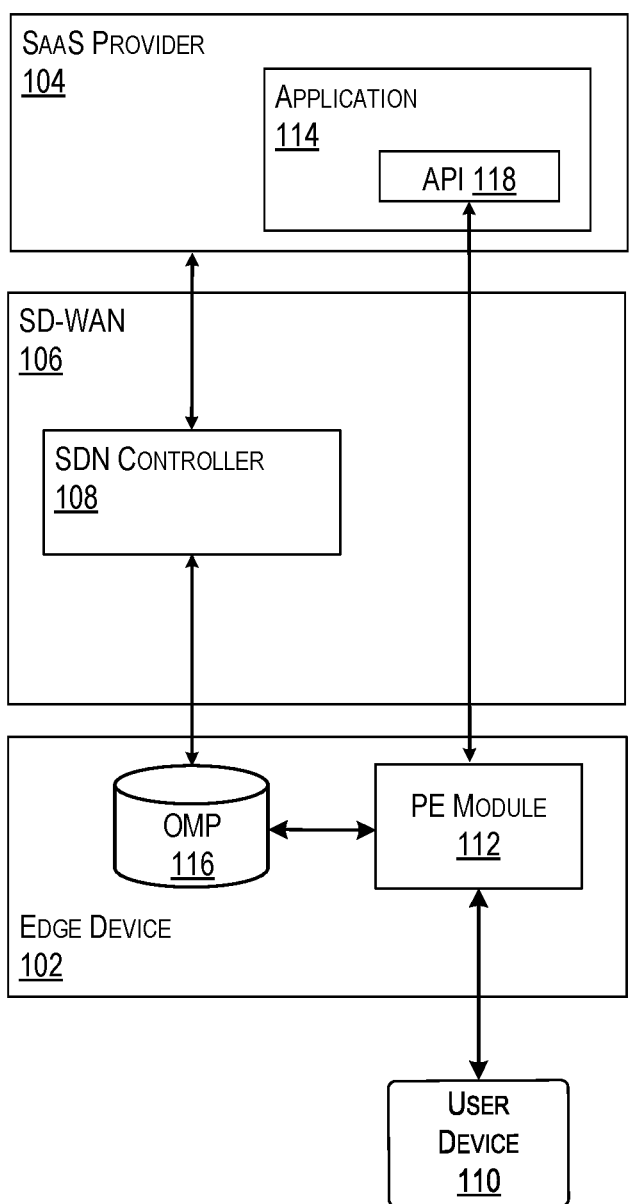
FIG. 1 depicts a block diagram illustrating an environment over which pathing between a number of components can be implemented in accordance with some embodiments as described herein.

A first method according to the techniques described herein may include generating, at network node, a set of paths to a destination, a first path of the set of paths being labeled as a direct path and a second path of the set of paths being labeled as an indirect path. The method further subsequently comprises receiving, by the network node, a communication from a source and directed to the destination, determining, based on a first indicated path preference for the destination and a second indicated path preference for the source, a path category, selecting a forwarding path as one of the first path or the second path based on the determined path category, and routing the communication to a next hop in the selected forwarding path.

Additionally, the techniques described herein may be performed by a system and/or device having non-transitory computer-readable media storing computer-executable instructions that, when executed by one or more processors, performs the method described above.

Example Embodiments

This disclosure describes techniques that may be performed to provide for bi-directional path selection to be used in communication routing path selection. Particularly, this disclosure provides techniques that enable a way to indicate bi-directional path preferences in data policy (e.g., for policy-based routing in data plane) when multiple paths are provided by OMP routing. This may be very useful when there are multiple destinations with the same (or overlapping) paths but with different path requirements like SLA or stateful feature execution.

In embodiments, information about transport requirements for each of a number of destinations (e.g., applications, user devices, etc.) is used to determine a respective path preference for each of those destinations. The path preference for each destination may be assigned as either "direct" or "indirect" depending on its respective transport requirements. These path preferences may then be communicated to each node operating in the network in order to provide improved bi-directional path routing across the network.

As would be recognized by one skilled in the art, a node operating on a network would typically identify a number of paths that are available for transporting data from itself to each destination. In such cases, the node may store an indication of the next hop in such a path within a routing table (such as a FIB table). In embodiments of the disclosure, various nodes are identified as nodes that perform various transport services (e.g., firewalling, etc.) on traffic that it processes. Such nodes may be identified, for example, by virtue of being implemented within a site operated by an entity that performs such transport services. Nodes that are identified as performing transport services on their traffic may be classified in a manner that they can be distinguished from other nodes. For example, the nodes may be classified as a transit gateway in order to distinguish them from typical nodes.

When a node originates (or re-originates) paths included in a routing table (e.g., the FIB), the node may label each path as being a "direct" path or an "indirect" path. An "indirect" path, for the purposes of this disclosure, is a path that includes a node that performs transport services on its traffic. A direct path, for the purposes of this disclosure, is a path that does not include such a node.

When the node receives a communication that is directed to a particular destination, the node can perform a path selection process to determine which of the available paths should be used to relay the communication. In contrast to the path selection process that is performed in a conventional system that determines path routing based on a destination, the node makes a determination about path routing based on an indicated path preference for both the destination and a source of the communication. In such a case, the node selects a path from those labeled as an indirect path if either of the destination or the source indicate a path preference of indirect. Otherwise, the node selects a path from those labeled as a direct path.

Embodiments of the disclosure provide for a number of advantages over conventional systems. In SDWAN deployments, there are often situations in which there are multiple overlay routes to a destination from a branch. This is especially true in data center and cloud deployments where destinations are regional, such as where some destinations are only reachable through a single SDWAN site or router (e.g., a "home router") but the SDWAN site itself is reachable through multiple paths. Embodiments of the disclosure solve an issue that occurs when different destinations behind the home router have different transport requirements, such as SLA constraints and stateful features (e.g., firewall) that need to be applied. Particularly, embodiments of the disclosure enable bidirectional pathing that can accommodate different applications that are reachable via the same home router.

It should be noted that while conventional OMP/control policies can solve most issues related to path selection in one direction, such policies are typically not able to solve issues related to path selection in the opposite direction. In each direction, a next-hop in a path is typically selected based on a destination of the communication. This can be problematic when the source of the communication has implemented certain transport requirements and represents a fundamental limitation. The problem also cannot be solved by data policy alone (policy applied to packets in the packet path) as such path selection is non-deterministic using current mechanisms. Embodiments of the disclosure provide a solution to this and other problems with systems that use such conventional path selection.

FIG. 1 depicts a block diagram illustrating an environment over which pathing between a number of components can be implemented in accordance with some embodiments as described herein. More particularly, a process of path selection may involve interactions between an edge device 102, a SaaS provider 104, and an SD-WAN fabric 106. Various aspects of the SD-WAN fabric 106 may be managed by a SDN controller 108.

As described elsewhere, an edge device 102 may be configured to receive, from a user device 110, a request to access an application 114 instantiated on, and managed by, a SaaS provider 104 over one or more paths (e.g., tunnels) implemented within an SD-WAN fabric 106. In order to process such a request, the edge device 102, or rather a path evaluation (PE) module 112 instantiated on the edge device 102, may use information about application pathing preferences to select a path to be used by traffic in reaching a destination. In some embodiments, the PE module 112 may use Overlay Management Protocol (OMP) information 116 distributed by the SDN controller 108.

A destination (to which a path selection is made) may be an application 114 hosted by the SaaS provider 104. In other cases, such a destination may be a second client device that is different from the client device 110, the second client device being reachable via a second edge device. Where the destination is an application 114 hosted by a SaaS provider 104, the application 114 may be accessed via an application programming interface (API) 118 included on the SaaS provider 104.

During operation, the SDN controller 108 may generate OMP information 116 to be distributed to each of a number of nodes operating within the SDWAN, including a number of edge devices 102. In embodiments, such OMP information 116 is used in originating (or re-originating) a Forwarding Information Base (FIB) that is used by each node in making routing decisions.

In some embodiments, the SDN controller 108 may identify one or more nodes within the SDWAN as implementing various security features (e.g., virus scanning, firewall, etc.). In this example, a rating or score may be assigned to each node corresponding to a level of service provided to traffic handled by that node. If the assigned score is above a threshold score value, the SDN controller may categorize that node as a transit gateway (TGW) in the OMP for the purposes of traffic routing. When a node uses this OMP information to originate (or re-originate) routing paths to be included in the FIB, a path that travels through a node categorized as a TGW is labeled as an "indirect" path, whereas a path that does not travel through a node categorized as a TGW is labeled as a "direct" path.

In some embodiments, paths may be determined to be either "direct" or "indirect" paths based on a number of hops determined to be in the path. For example, if a node associated directly with a destination (e.g., operating within a site associated with the destination) is within a threshold number of hops from the network node that is originating the FIB, then the path to that node may be considered a "direct" path whereas a path to a node in which the number of hops exceeds such a threshold would constitute an "indirect" path. For example, in some cases a "direct" path may be identified where a next hop (e.g., a threshold of 1 hop) in the path would land at a network node that is within a site associated with the destination. In this example, every path that does not have a next hop that lands at a network node within that site would be considered "indirect" for the purposes of routing.

As would be appreciated by one skilled in the art, this would result in a FIB that includes multiple paths to a destination, with some of those paths being labeled as "direct" and some of those paths being labeled as "indirect." Furthermore, it would be recognized that by labeling the paths included in the FIB in this manner, an "indirect" path would be one that performs a higher number of transport services on traffic traversing it.

The OMP information 116 may also include an indication of a routing preference associated with individual entities (e.g., applications, user devices, etc.) that can act as destinations (e.g., end points) or sources (e.g., origin points). More particularly, a routing preference may indicate whether a "direct" path or an "indirect" path is preferred for the respective entity. Such an indication may be determined based on transport requirements associated with that entity. For example, entities that require a greater level of security (e.g., virus scanning, firewall, etc.) may indicate a preference for an "indirect" path (which is more likely to provide such services) whereas entities that do not have such transport requirements may indicate a preference for a "direct" path.

In operation, when a node (e.g., edge device 102) receives a communication (e.g., a data packet) to be routed to/from an entity, the PE module 112 may select an optimal path based on OMP information 116. More particularly, the PE module 112 will limit its selection of paths based on a label. Note that while route selection is typically performed with regard to a destination (e.g., as indicated via a destination prefix in the communication), the PE module 112 as implemented herein may take into account both the destination and the source (e.g., as indicated via a source prefix in the communication). For example, the PE module 112 may identify a preference for each of the destination and the source. In this example, if the preference associated with either is "indirect," then the PE module 112 may limit its path selection to only those labeled as "indirect." Otherwise, if neither preference is indicated as being "indirect," the PE module 112 may limit its path selection to only those labeled as "direct." It should be noted that a number of algorithms for selecting an optimal routing path from a set of available routing paths would be known to one skilled in the art. Accordingly, once the PE module 112 has identified a set of paths that are labeled in accordance with an indicated preference, the PE module 112 may perform any suitable technique for selecting an optimal routing path from that identified set of routing paths. Once the optimal routing path is selected by the PE module 112, the node (e.g., edge device 102) will send the communication to the next hop along that routing path.

Figure 2A:
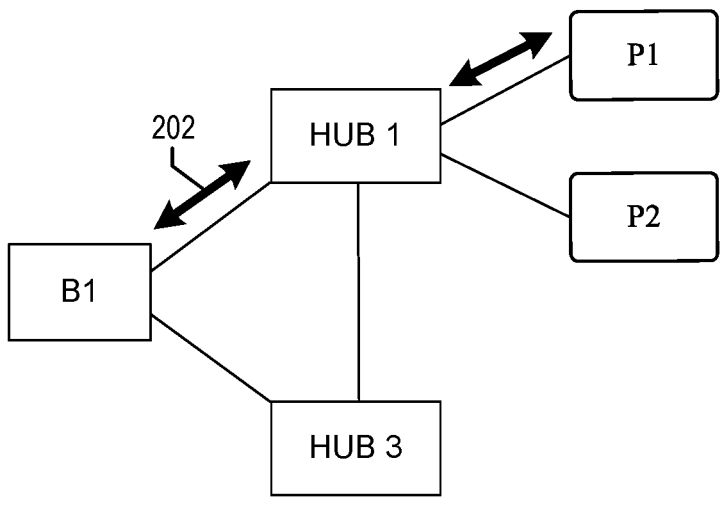
FIG. 2A depict a first illustrative example of routing path selection that may be made in a case that has fewer transport requirements in accordance with embodiments.
Figure 2B:
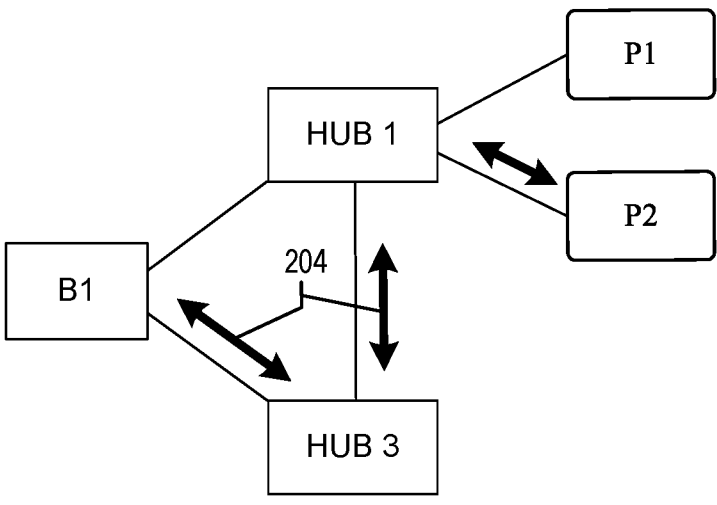
FIG. 2B depict a second illustrative example of routing path selection that may be made in a case that has higher transport requirements in accordance with embodiments.

FIGS. 2A and 2B depicts examples of routing path selection that may be implemented in a network (e.g., a SD-WAN) in accordance with embodiments. In each of FIGS. 2A and 2B, a simplified example of a network, which may be a SDWAN network, is shown that includes a node B1 (which may be any suitable computing device, such as an edge device), two "hub" nodes HUB 1 and HUB 3 (which may correspond to nodes operating within the network), and two applications P1 and P2.

FIG. 2A depict a first illustrative example of routing path selection that may be made in a case that has fewer transport requirements in accordance with embodiments.

FIG. 2B depict a second illustrative example of routing path selection that may be made in a case that has higher transport requirements in accordance with embodiments.

In both of these examples, assume that P1 is an application with no special transport needs. On the other hand, P2 is an application that needs transport requirements, such as firewalling and/or various SLA constraints. Each of the applications P1 and P2 are accessible via HUB 1, which is considered a home router for the purposes of this example. There are multiple bidirectional paths to/from HUB 1, so there is a question as to which path should be taken. Assume also that HUB 1 does not perform any notable transport services on traffic flowing through it, whereas HUB 3 performs at least some transport services on traffic flowing through it.

In embodiments, because of the transport services that HUB 3 performs on traffic flowing through it, HUB 3 may be categorized by a SDN controller as a TGW within OMP information that is provisioned onto the nodes of the example network (e.g., B1, HUB 1, and HUB 3). When B1 uses the provided OMP information to originate a set of potential paths between itself and P1/P2 (to be included in a FIB), the path that includes HUB 3 will be labeled as an "indirect" path since HUB 3 is categorized as a TGW. In contrast, the path from B1 straight to HUB 1 (that does not include HUB 3) would be labeled as a "direct" path. In some embodiments, the path that includes HUB 3 will be labeled as an "indirect" path since the next hop in that path does not include a network node associated with the destination (e.g., home router HUB 1). Alternatively, the path from B1 straight to HUB 1 would be labeled as a "direct" path since the next hop is HUB 1.

As shown in FIG. 2A, traffic between B1 and P1 will flow through path 202. This is because application P1 has no transport requirements and hence will have an indicated path preference of "direct." Note that routing communications through a direct path will typically result in lower transit/ response time, latency, jitter, etc. Hence, the use of a direct path is likely to be optimal in cases that have few transport requirements.

In the depicted example, path 202 will be selected for communications received at B1 that are directed to P1. In such a case, when the communication is received at B1, a lookup is performed (e.g., within OMP information stored at B1) to determine that both the destination and the source (e.g., P1 and B1 (which we will also assume has no transport requirements)) has a path preference of "direct." In such a case, the path 202, which is labeled as "direct" is selected by a PE module implemented on B1 for routing of the communication to P1.

Likewise path 202 will be selected for communications received at HUB 1 that are received from P1 and directed to B1. In such a case, when the communication is received at HUB 1, a lookup is performed (e.g., within OMP information stored at HUB 1) to determine that both P1 and B1 has a path preference of "direct." In such a case, the path 202, which is labeled as "direct" is selected by a PE module implemented on HUB 1 for routing of the communication to B1.

As shown in FIG. 2B, traffic between B1 and P2 will flow through HUB 3 because the path through HUB 3 is more likely to meet transport/SLA requirements (presumably because of the transport services performed by HUB 3 on its traffic) associated with P2.

In the depicted example, route 204 will be selected for communications received at B1 that are directed to P2. In such a case, when the communication is received at B1, a lookup is performed (e.g., within OMP information stored at B1) to determine that while the source B1 has a path preference of "direct," the destination P2 has a path preference of "indirect." In such a case, the preference for "indirect" takes priority over the path preference for "direct." In such a case, the route 204, which is labeled as "indirect" is selected by a PE module implemented on B1 for routing of the communication to P2 by way of HUB 3.

Likewise route 204 will be selected for communications received at HUB 1 from P2 that are directed to B1. In such a case, when the communication is received at HUB 1, a lookup is performed (e.g., within OMP information stored at HUB 1) to determine that B1 has a path preference of "direct," P2 has a path preference of "indirect." In such a case, the route 204, which is labeled as "indirect" is selected by a PE module implemented on HUB 1 for routing of the communication to B1 by way of HUB 3.

FIG. 3 depicts a block diagram illustrating an example of a routing setup for direct and indirect paths to be implemented in accordance with some embodiments. More particularly, the routing setup depicted in FIG. 3 relates to the exemplary routing path selection depicted in each of FIG. 2A and FIG. 2B.

Provided that the various routes between P1/P2 and B1 are labeled as noted in FIGS. 2A and 2B, then choosing either one of these paths based on prefix matching P1 & P2 in both directions (e.g., destination and source) yields the solution. Basically, the next hop can be filtered by the forwarding plane according to the match criteria specified in the data policy (OMP 302). By way of non-limiting example, information that may be included in an exemplary OMP (as included in FIG. 3) is recreated below.

```
data-policy dp-forward
    seq 10
        match dest-prefix P1
        action accept set prefer-direct
    seq 20
        match dest-prefix P2
        action accept set prefer-indirect
apply-policy site-list site_list_B1 data-policy dp1 from-
    service
data-policy dp-reverse
    seq 10
        match src-prefix P1
        action accept set prefer-direct
    seq 20
        match src-prefix P2
        action accept set prefer-indirect
apply-policy site-list site_list_HUB1 data-policy dp-re-
    verse from-service
```

When selecting a data path, the PE module 304 of a node compares information about the communication to be routed against the data policy. If the PE module matches the communication to sequence 10 as noted in the OMP 302, it attempts to match P1 and the direct path 306 is chosen if the match is positive (based on the indicated preference). In this case, the PE module 304 routes the communication to the next hop 1, which represents the next hop along the direct path 306.

If the PE module does not match the communication to sequence 10 as noted in the OMP 302, it means it is not a packet directed to or from P1. If the PE module matches the communication to sequence 20 as noted in the OMP 302, then it means it is a packet that is directed to or from P2, and the indirect path 308 is selected (based on the indicated preference). In this case, the PE module 304 routes the communication to the next hop 2, which represents the next hop along the indirect path 308.

Hence, for two different prefixes homed through the same node (e.g., home router), we choose different paths. In this way we have guaranteed that the transport services of Hub 3 are applied to all traffic to/from application P2. In contrast, for traffic directed to/from application P1, we have chosen an economical path.

Note that there can be multiple routers and multiple tunnels in the SDWAN network. In some cases, multiple paths may be labeled as "direct" and/or "indirect." In such cases, paths may be selected from a set of potential paths having an appropriate label based on existing mechanisms like affinity and SLA based Application-Aware Routing (AAR) forwarding.

Figure 4:
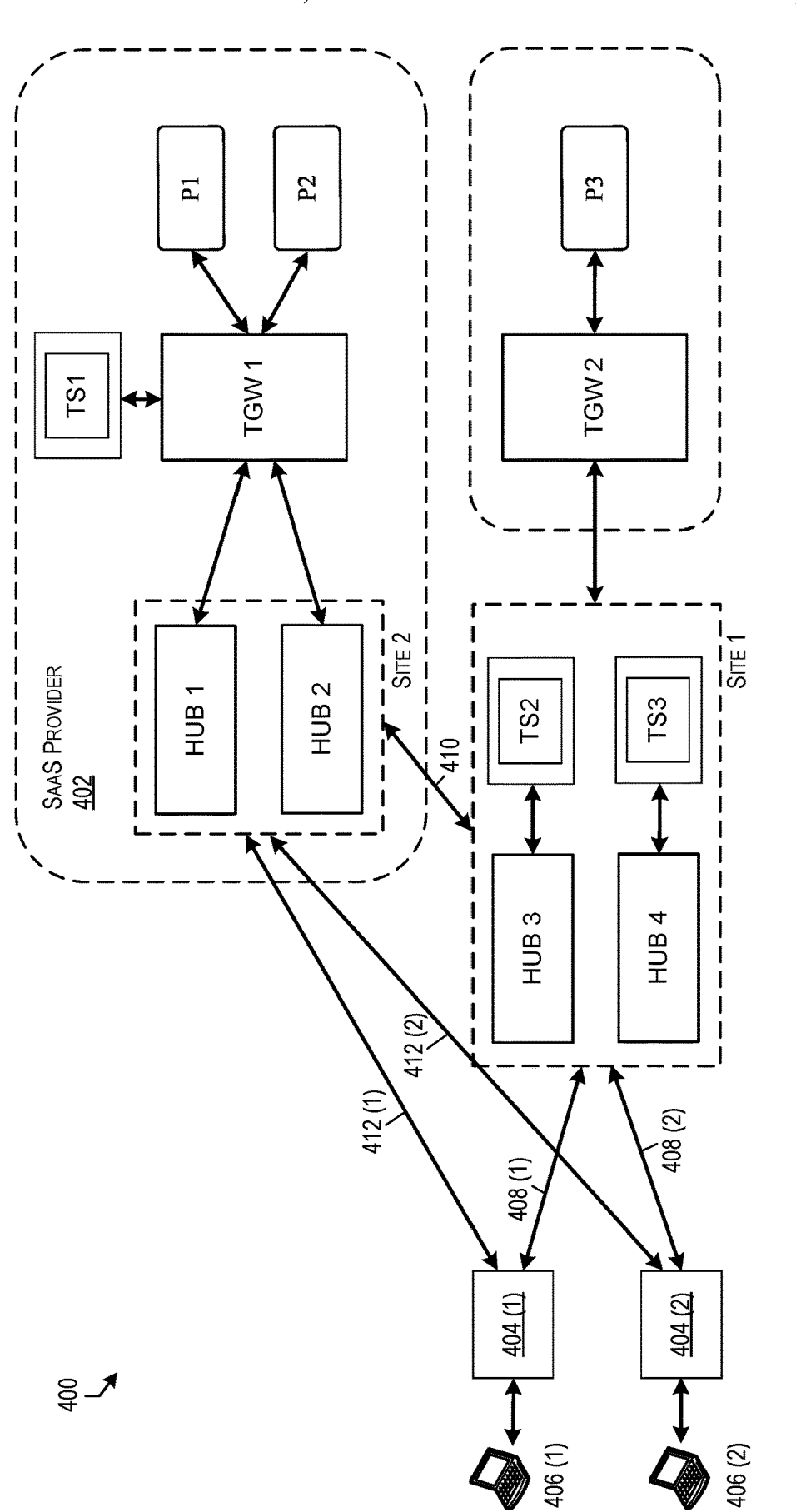
FIG. 4 depicts a block diagram illustrating an example of an environment in which techniques described herein may be implemented with reference to a cloud and middle-mile topology.

FIG. 4 depicts a block diagram illustrating an example of an environment in which techniques described herein may be implemented with reference to a cloud and middle-mile topology. As depicted in the environment 400, a network (e.g., a SDWAN network) may include a number of nodes that are geographically distributed.

In embodiments, the network may include one or more "sites" (e.g., Site 1, Site 2, etc.) that each include a group of nodes, some of which may be implemented as virtual machines. In some cases, a site may be operated by an application hosting service, such as a SaaS provider 402. In embodiments, the nodes included in one or more sites may perform various transport services (e.g., TS1, TS2, and TS3) on network traffic that is routed through it. By way of example, such transport services may include firewalling, virus scanning, access management, etc.

As noted elsewhere, the environment 400 may provide access to one or more applications (e.g., P1, P2, and P3). In embodiments, such applications may be accessible via a transit gateway (TGW) (e.g., TGW 1 and TGW 2) in communication with the network. In some cases, a TGW may implement various transport services on network traffic that it handles. For example, in the depicted example, TGW 1 may perform TS1 on network traffic flowing between an application P1 or P2 and HUB 1 or HUB 2 of Site 2.

As noted elsewhere, the environment 400 may further include a number of edge devices 404 (e.g., edge device 404 (1) and 404 (2)) that provide ingress/egress to the network. An edge device 404 may be accessed by one or more user device 406 (e.g., edge device 406 (1) and 406 (2)).

The illustrated example of FIG. 4 shows deployment in which Site 1 is a middle-mile provider that connects to cloud workloads in a multi-cloud environment. Various branches (e.g., edge devices 404) may be connected to the Site 1 via path 408 (1 and 2) and 410. The branches are also connected to the cloud directly via a path 412 (1 and 2) but that path is not preferred for critical workloads (e.g., traffic to/from application P2 in this case). In contrast, the path made up of 408 and 410 is preferred because it likely has better SLA guarantee from Site 1 based on performance of TS2 and TS3 on traffic flowing through it.

In operation, when a communication (e.g., an access request) is received at an edge device 404 (or other suitable node), that edge device will make a path routing determination to be applied when forwarding the communication. In such cases, the edge device 404 may assess both the source of the communication and the destination of the communication to determine whether the communication should be routed over a direct path (e.g., 412) or an indirect path (e.g., 408 and 410). In such cases, if either the source of the communication or the destination of the communication has an indicated preference of indirect, then the indirect path (e.g., 408 and 410) is selected for routing. If neither of the source of the communication or the destination of the communication has an indicated preference of indirect (e.g., both indicate a preference of "direct"), then the direct path (e.g., 408 and 410) is selected for routing.

Figure 5:
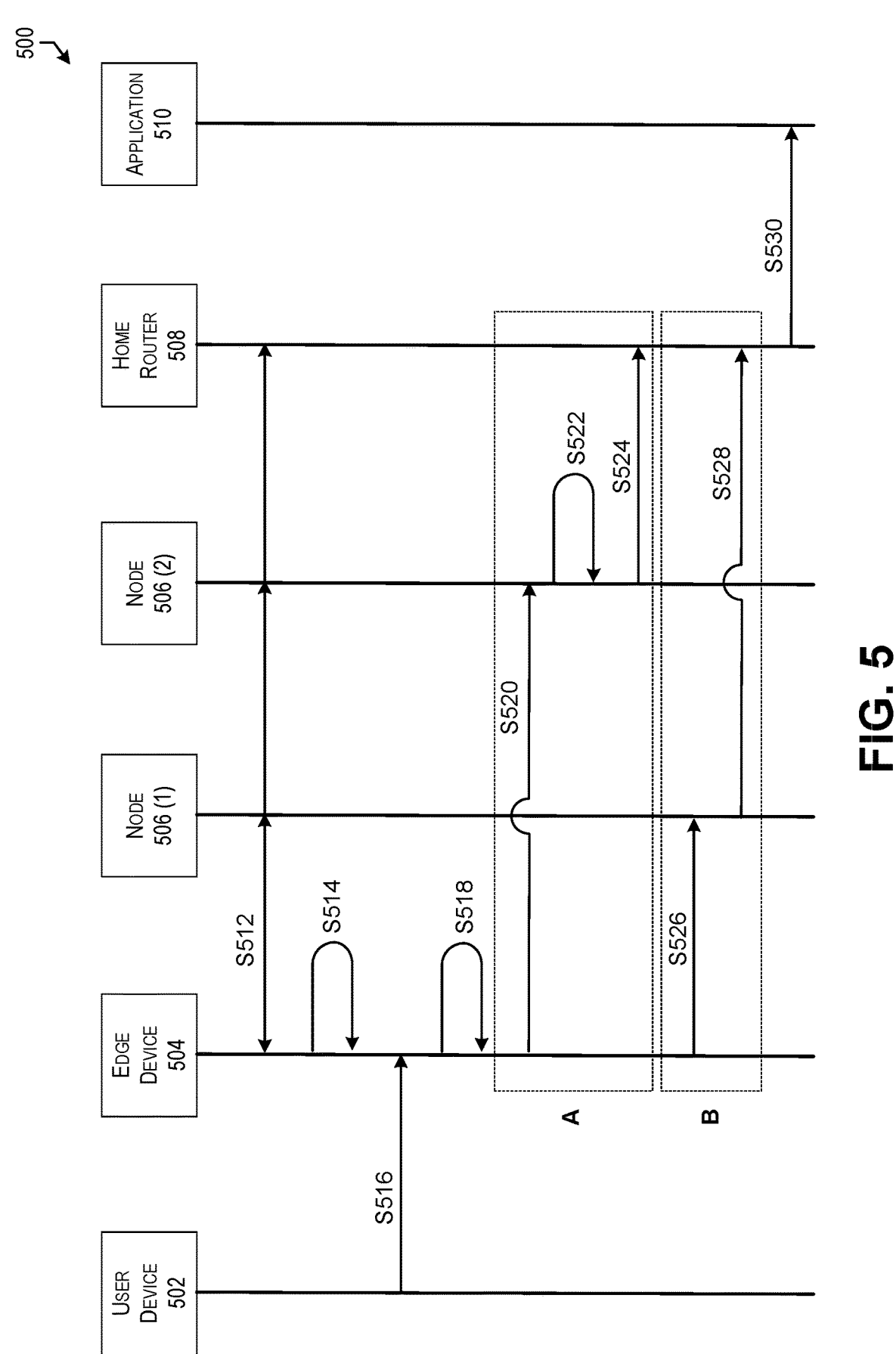
FIG. 5 depicts a swim lane diagram illustrating a first example process for routing communications between entities in a network in accordance with some embodiments.

FIG. 5 depicts a swim lane diagram illustrating a first example process for routing communications between entities in a network in accordance with some embodiments. More particularly, the example process 500 is represented as interactions between a user device 502 (operating outside of a network), an edge device 504 (operating as an ingress/ egress point for a network), multiple nodes 506 (1 and 2), a home router 508, and a host of one or more application 510. For the purposes of the example provided in FIG. 5, node 506 (1) may perform few or no transport services on network traffic flowing through it whereas node 506 (2) may perform a greater number of transport services on network traffic flowing through it.

Initially, a node operating on a network, such as an edge device 504 may generate a set of potential paths that may be used to communicate with each of a number of destinations. This may involve querying various other nodes on the network (e.g., nodes 506, home router 508, etc.) at S512 to determine if such nodes lie along a path to a particular destination. When a path is identified in such a manner, it may be added into a forwarding information base (FIB) as a potential path to the destination at S514. In embodiments, rather than store information about the complete path to the destination, the FIB may store an indication of only the next hop (e.g., the next node in the path) to the destination.

As noted elsewhere, each of the paths identified to a destination in such a manner and added to the FIB may be labeled as being either a direct or indirect path. In embodiments, because the node 506 (2) performs a greater number of transport services on network traffic flowing through it, it may be categorized as such. In some cases, such a node may be classified as a TGW in order to differentiate paths that include such a node. When generating labels to be applied to each path stored in the FIB, a path that includes a node categorized as one that performs transport services on its traffic would be labeled as an indirect path whereas a path that does not include such a node would be labeled as a direct path.

At S516, the edge device 504 may receive a communication from a user device 502 that is directed to a destination (e.g., application 510). Upon receiving such a communication, the edge device 504 may assess the communication at S518 to determine an appropriate path over which the communication can be routed. During this step, the edge device 504 makes a determination of a path category. In other words, the edge device 504 makes a determination as to whether a direct path or an indirect path should be used based on policy data (e.g., OMP information 116). More particularly, the edge device 504 may make such a determination based on an indicated path preference for both the source of the communication (e.g., the user device 502) and the destination of the communication (e.g., the application 510). In such cases, if either the destination of the communication or the source of the communication indicates a path preference of indirect, then a determination is made that an indirect path will be selected. Alternatively, if neither the destination of the communication nor the source of the communication indicates a path preference of indirect (e.g., both indicate direct), then a determination is made that a direct path will be selected.

For the purposes of the example process 500, assume that a first path that includes node 506 (1) as a next hop is labeled as a direct path whereas a second path that includes node 506 (2) as a next hop is labeled as an indirect path.

The process 500 depicts two separate scenarios that may play out based on the determined path category. In a first Scenario A, the edge device 504 determines a path category for the communication as being "indirect." In such a scenario, the edge device 504 routes the communication to a next hop in the path that includes node 506 (2) at S520. When the communication makes its way to node 506 (2), the node 506 (2) performs a number of transport services on that communication at S522 before forwarding the communication to the home router 508 at S524.

In a second Scenario B, the edge device 504 determines a path category for the communication as being "direct." In such a scenario, the edge device 504 routes the communication to a next hop in the path that includes node 506 (1) at S526. Upon receiving the communication, the node 506 (1) forwards the communication to the home router 508 at S528.

Upon receiving the communication directed to the application 510, from either Scenario A or Scenario B, the home router 508 forwards that communication to the application 510. In embodiments, such a communication may be relayed to an API associated with the application 510.

Figure 6:
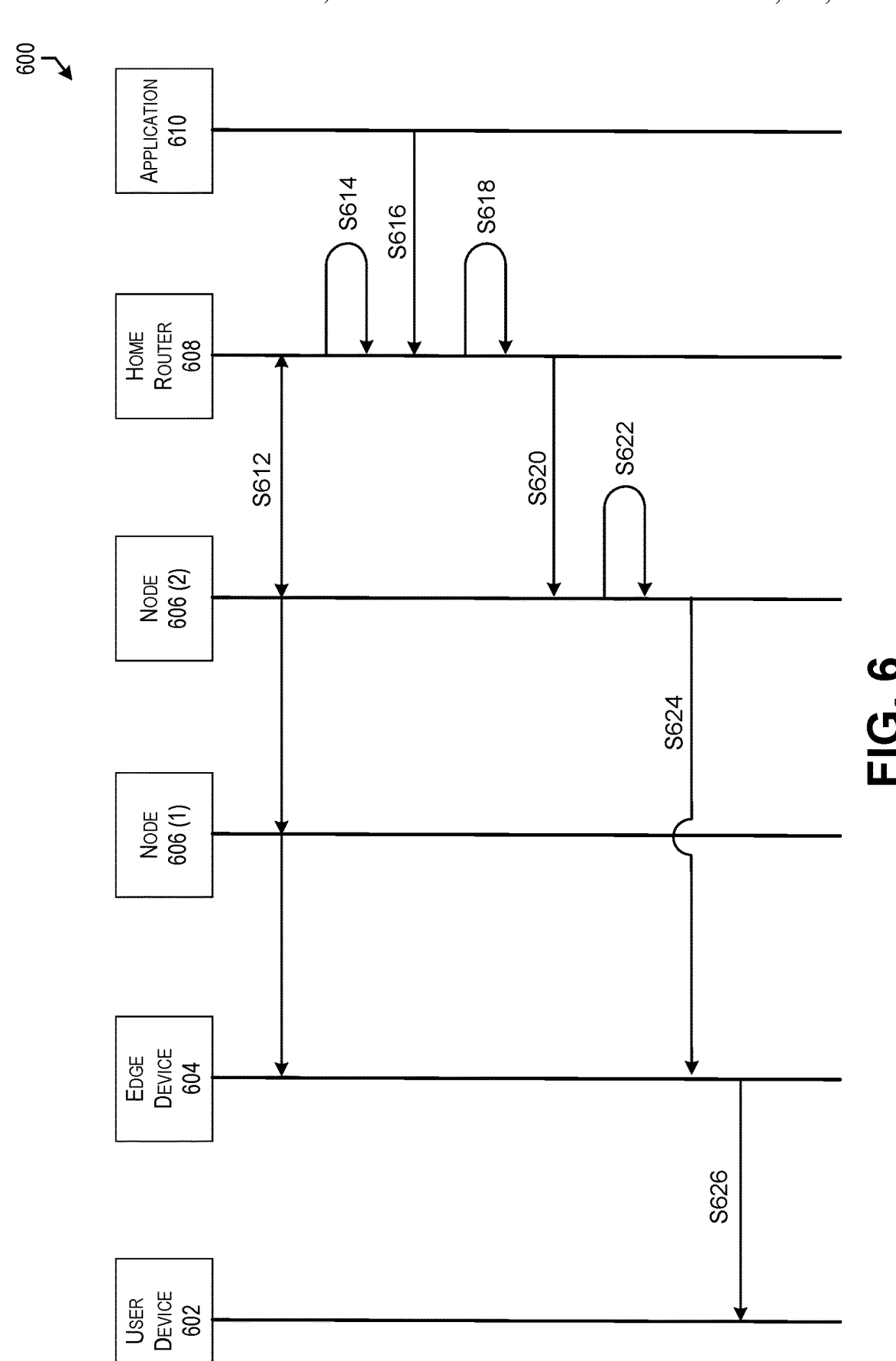
FIG. 6 depicts a swim lane diagram illustrating a second example process for routing communications between entities in a network in accordance with some embodiments.

FIG. 6 depicts a swim lane diagram illustrating a second example process for routing communications between entities in a network in accordance with some embodiments. More particularly, the example process 600 is represented as interactions between a user device 602 (operating outside of a network), an edge device 604 (operating as an ingress/ egress point for a network), multiple nodes 606 (1 and 2), a home router 608, and a host of one or more application 610. For the purposes of the example provided in FIG. 6, node 606 (1) may perform few or no transport services on network traffic flowing through it whereas node 606 (2) may perform a greater number of transport services on network traffic flowing through it.

Similar to S512 of process 500, a home router 608 operating on a network may generate a set of potential paths that may be used to communicate with each of a number of destinations. This may involve querying various other nodes on the network (e.g., nodes 606, edge device 604, etc.) at S612 to determine if such nodes lie along a path to a particular destination. As noted elsewhere, when a path is identified in such a manner, it may be added into a FIB as a potential path to the destination at S614.

As noted elsewhere, each of the paths identified to a destination in such a manner and added to the FIB may be labeled as being either a direct or indirect path. Similar to process 500 above, because the node 606 (2) performs a greater number of transport services on network traffic flowing through it, it may be categorized as such. In some cases, the node 606 (2) may be classified as a TGW in order to differentiate paths that include such a node. When generating labels to be applied to each path stored in the FIB, a path that includes a node categorized as one that performs transport services on its traffic would be labeled as an indirect path whereas a path that does not include such a node would be labeled as a direct path.

At S616, the home router 608 may receive a communication from an application 610 that is directed to a destination (e.g., user device 602). Upon receiving such a communication, the home router 608 may assess the communication at S618 to determine an appropriate path over which the communication can be routed. During this step, the home router 608 makes a determination of a path category. In other words, the home router 608 makes a determination as to whether a direct path or an indirect path should be used based on policy data (e.g., OMP information 116). More particularly, the home router 608 may make such a determination based on an indicated path preference for both the source of the communication (e.g., the application 610) and the destination of the communication (e.g., the user device 602). In such cases, if either the destination of the communication or the source of the communication indicates a path preference of indirect, then a determination is made that an indirect path will be selected. Alternatively, if neither the destination of the communication nor the source of the communication indicates a path preference of indirect (e.g., both indicate direct), then a determination is made that a direct path will be selected.

In the process 600, assume that the home router 608 determines a path category for the communication as being "indirect." In such a scenario, the home router 608 routes the communication to a next hop in the path that includes node 606 (2) at S620. When the communication makes its way to node 606 (2), the node 606 (2) performs a number of transport services on that communication at S622 before forwarding the communication to the edge device 604 at S624. Upon receiving the communication directed to the user device 602, the edge device 604 forwards that communication to the user device 602.

Figure 7:
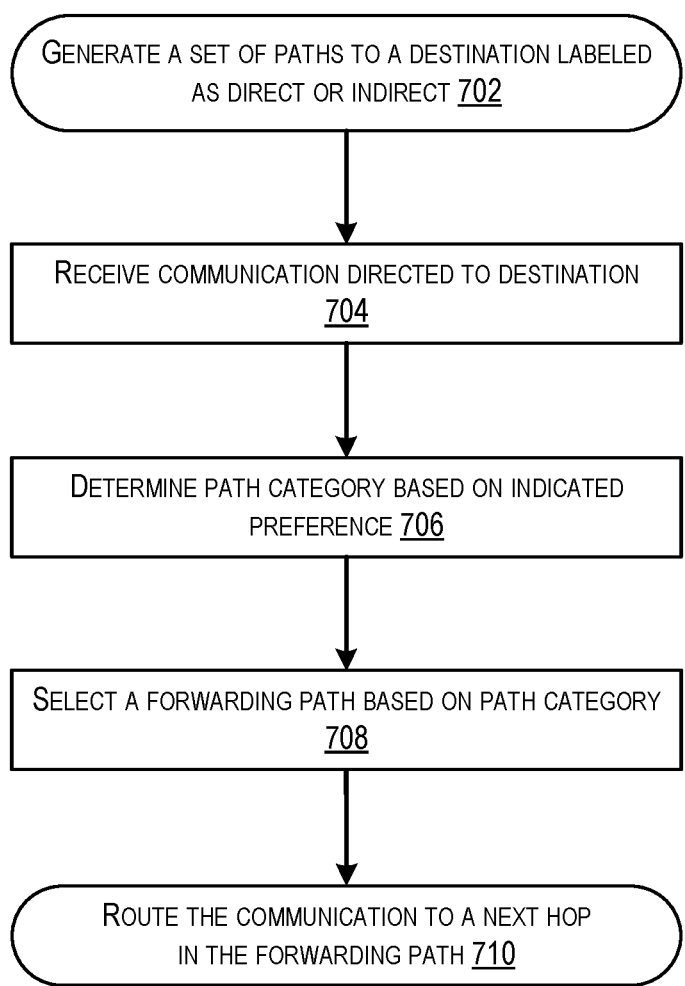
FIG. 7 depicts a flow diagram illustrating an example process for performing bi-directional path selection based on indicated preferences in policy data in accordance with some embodiments.

FIG. 7 depicts a flow diagram illustrating an example process for performing bi-directional path selection based on indicated preferences in policy data in accordance with some embodiments. The process 700 may be performed by a node operating on a network in order to identify a next hop to which a received communication should be routed.

At 702, the process 700 may involve generating a set of paths to a destination. In such a generated set of paths, at least one first path of the set of paths is labeled as a direct path and at least one second path of the set of paths is labeled as an indirect path. The second path may be labeled as an indirect path based on the second path including a second network node associated with one or more transport services that it performs on network traffic. In some cases, the second network node is determined to be associated with one or more transport services by virtue of being included at a site associated with the one or more transport services. Exemplary transport services may include, but are not limited to, implementing a firewall, performing virus scanning, or performing access management. In some embodiments, the second network node is identified based on a classification assigned to it. For example, the second network node may be identified by virtue of being classified as TGW.

In embodiments, the set of paths is stored by the network node within a forwarding information base (FIB). In some cases, the FIB stores an indication of the next hop in each of the identified paths. It should be noted that multiple paths may be assigned a particular label within the FIB. For example, multiple different paths may be labeled as either "direct" or "indirect" provided that they meet the criteria for such a label.

At 704, the process 700 may involve receiving a communication from a source and directed to the destination. In embodiments, at least one of the source or the destination may be an application hosted by a service provider (e.g., a software as a service (SaaS) provider platform). Alternatively, at least one of the source or the destination comprises a user device in communication with the network.

At 706, the process 700 may involve determining, based on a first indicated path preference for the destination and a second indicated path preference for the source, a path category for the communication. The path category is determined to be an indirect path if either of the first indicated path preference for the destination or the second indicated path preference for the source indicate an indirect path. Alternatively, the path category is determined to be a direct path if both of the first indicated path preference for the destination and the second indicated path preference for the source indicate a direct path.

In embodiments, the first indicated path preference for the destination and the second indicated path preference for the source are obtained from policy data stored in a memory of the network node. Such policy data may include overlay management protocol (OMP) policy data provided by a SDN controller. In embodiments, an indicated path preference for an entity is determined by the SDN controller based on transport requirements associated with that entity.

At 708, the process 700 may involve selecting a forwarding path as one of the first path or the second path based on the determined path category. In addition to selecting a path that falls within a particular path category, the process may further involve selecting a path from those available in the path category based on additional route selection criteria. For example, if a determination is made that the path category is indirect and there are multiple paths labeled as indirect, then a path may be selected from all of the available paths that are labeled as indirect based on criteria such as a current jitter, latency, packet loss, bandwidth usage, or other suitable metrics currently associated with the route.

At 710, the process 700 may involve routing the communication to a next hop in the selected forwarding path. As would be recognized by one skilled in the art, the next hop may correspond to another network node that, when it receives the communication, is configured to repeat the process 700.

Figure 8:
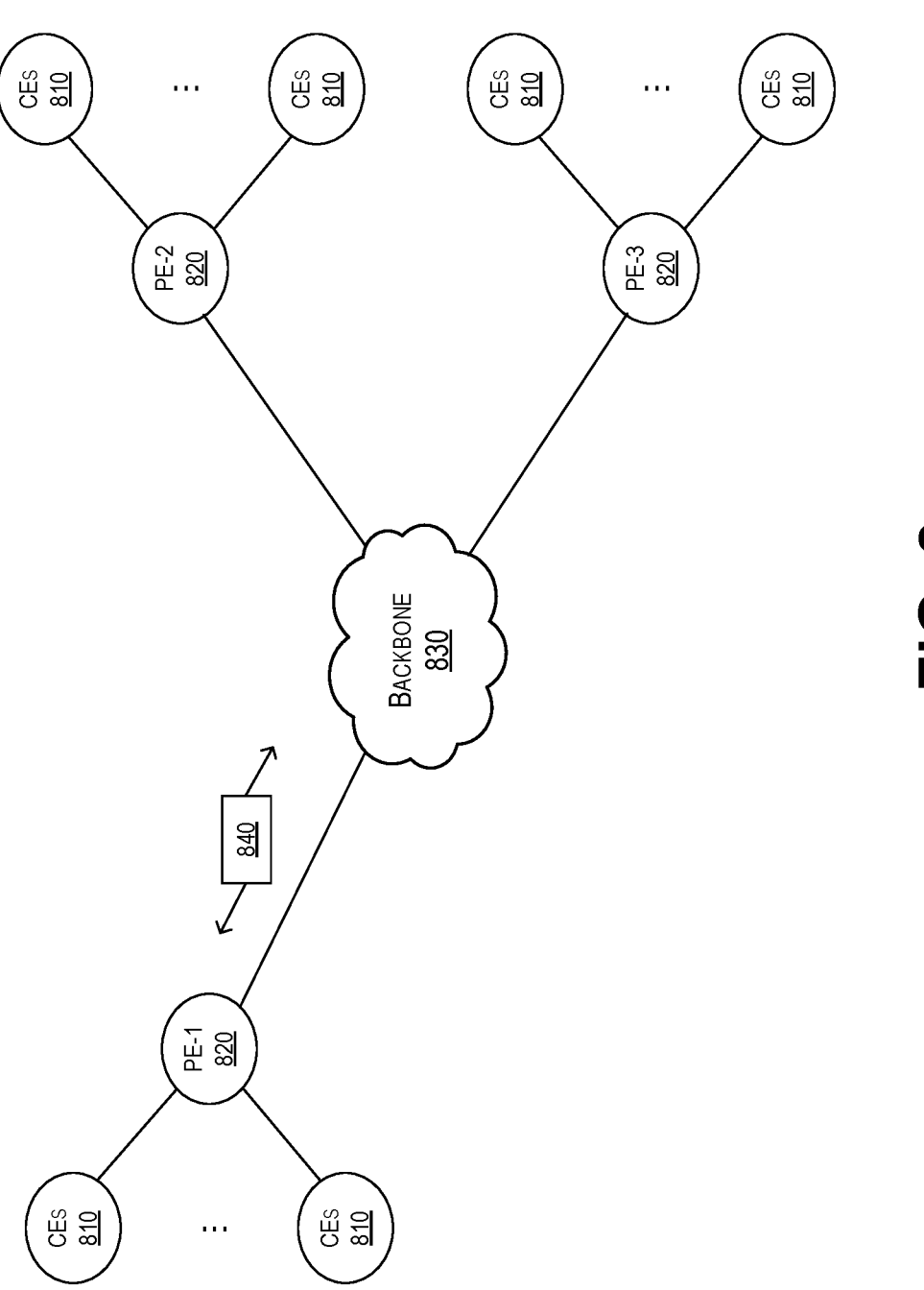
FIG. 8 is a schematic block diagram of an example computer network illustratively comprising nodes/devices, such as a plurality of routers/devices interconnected by links or networks, as shown.

FIG. 8 is a schematic block diagram of an example computer network 800 illustratively comprising nodes/devices, such as a plurality of routers/devices (e.g., edge devices) interconnected by links or networks, as shown. A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANS). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In the depicted example, customer edge (CE) routers 810 may be interconnected with provider edge (PE) routers 820 (e.g., PE-1, PE-2, and PE-3) in order to communicate across a core network, such as an illustrative network as backbone 830. For example, routers 810, 820 may be interconnected by the public Internet, a multiprotocol label switching (MPLS) virtual private network (VPN), or the like. Data packets 840 (e.g., traffic/messages) may be exchanged among the nodes/devices of the computer network 800 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 810 shown in network 800 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected is to network 800 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2, or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 810 connected to PE-2 and a second CE router 810 connected to PE-3.

Figure 9:
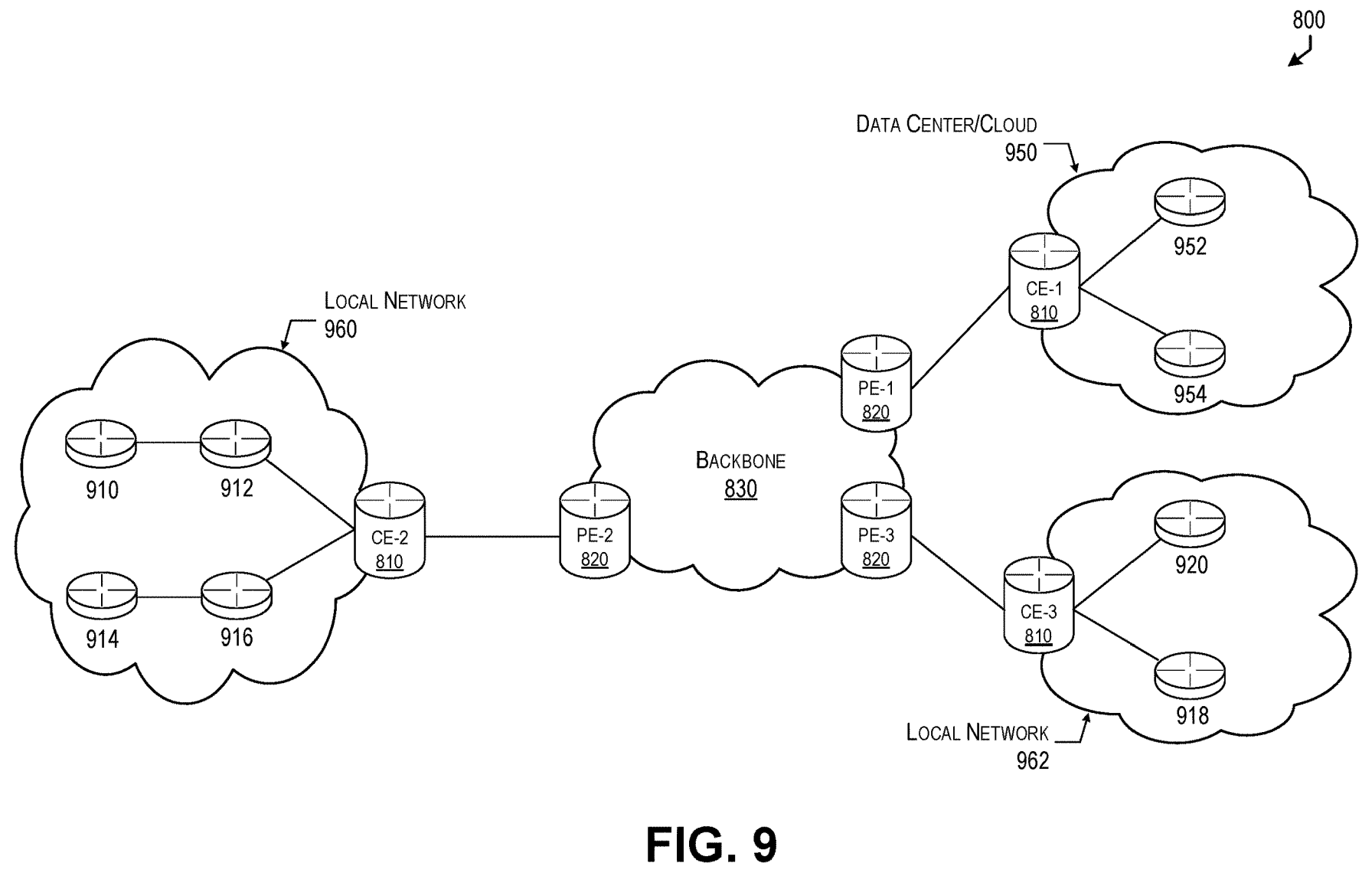

FIG. 9 illustrates an example of network 800 in greater detail, according to various embodiments. As shown, network backbone 830 may provide connectivity between devices located in different geographical areas and/or different types of local networks. For example, network 800 may comprise local/branch networks 960 and 962 that include devices/nodes 910, 912, 914, and 916 and devices/nodes 918 and 920, respectively, as well as a data center/cloud environment 950 that includes servers 952 and 954. Notably, local networks 960 and 962 and data center/cloud environment 950 may be located in different geographic locations.

Servers 952 and 954 may include, in various embodiments, a network management server (NMS), a dynamic host configuration protocol (DHCP) server, a constrained application protocol (COAP) server, an outage management system (OMS), an application policy infrastructure controller (APIC), an application server, etc. As would be appreciated, network 800 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software defined WAN (SD-WAN) may be used in network 800 to connect local network 960, local network 962, and data center/cloud environment 950. In general, an SD-WAN uses a software defined networking (SDN)-based approach to instantiate tunnels on top of the physical network and control routing decisions, accordingly. For example, as noted above, one tunnel may connect router CE-2 at the edge of local network 960 to router CE-1 at the edge of data center/cloud environment 950 over an MPLS or Internet-based service provider network in backbone 830. Similarly, a second tunnel may also connect these routers over a 4G/5G/LTE cellular service provider network. SD-WAN techniques allow the WAN functions to be virtualized, essentially forming a virtual connection between local network 960 and data center/cloud environment 950 on top of the various underlying connections. Another feature of SD-WAN is centralized management by a supervisory service that can monitor and adjust the various connections, as needed.

Figure 10:
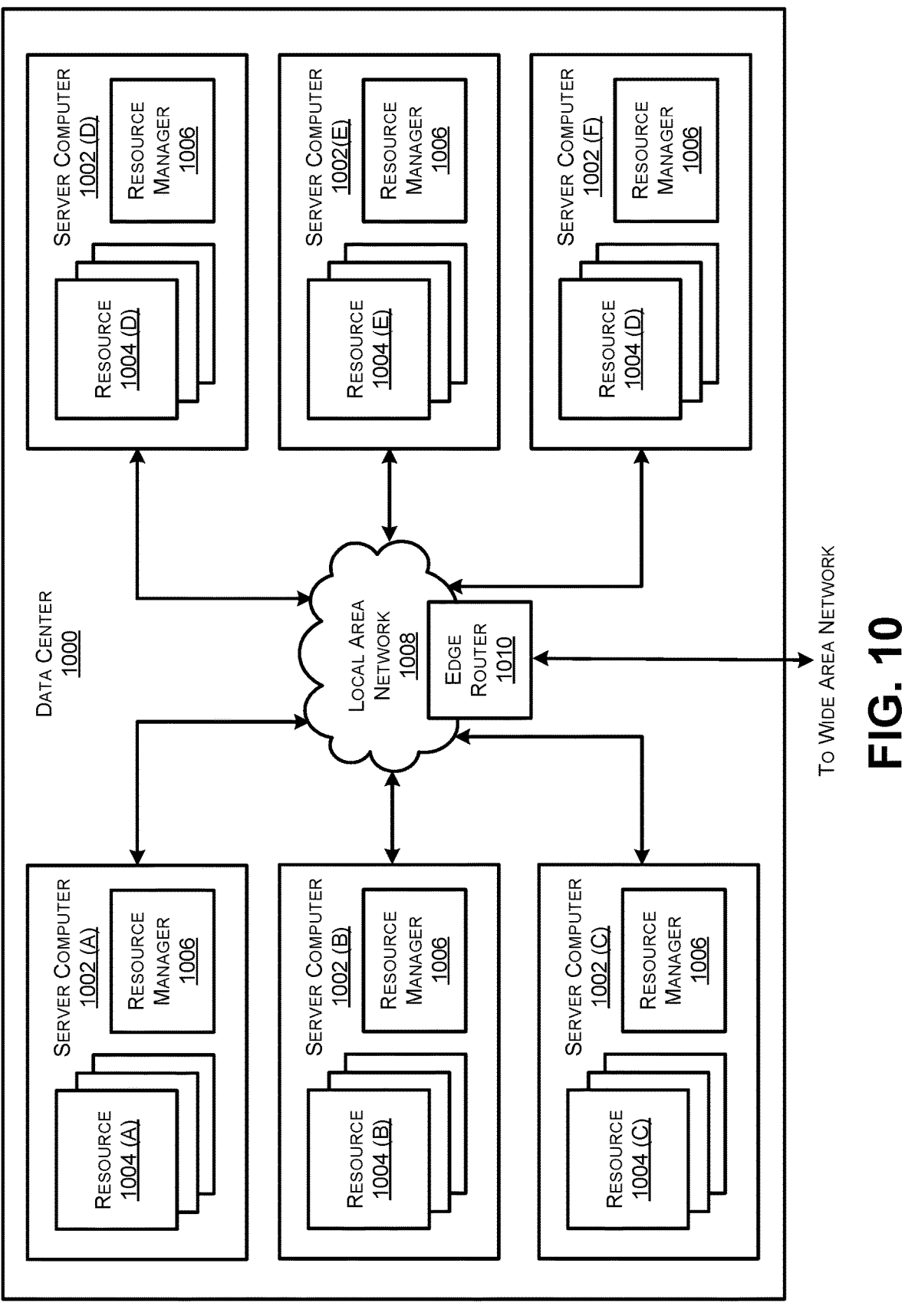
FIG. 10 is a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002A-1002F (which might be referred to herein singularly as "a server computer 1002" or in the plural as "the server computers 1002") for providing computing resources. In some examples, the resources and/or server computers 1002 may include, or correspond to, the any type of networked device described herein. Although described as servers, the server computers 1002 may comprise any type of networked device, such as servers, switches, routers, hubs, bridges, gateways, modems, repeaters, access points, etc.

The server computers 1002 can be standard tower, rack-mount, or blade server computers configured appropriately for providing computing resources. In some examples, the server computers 1002 may provide computing resources 1004 including data processing resources such as VM instances or hardware computing systems, database clusters, computing clusters, storage clusters, data storage resources, database resources, networking resources, and others. Some of the server computers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1000 can also be configured to provide network services and other types of services.

In the example data center 1000 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the server computers 1002A-1002F in each data center 1000, and, potentially, between computing resources in each of the server computers 1002. It should be appreciated that the configuration of the data center 1000 described with reference to FIG. 10 is merely illustrative and that other implementations can be utilized.

In some examples, the server computers 1002 may each execute one or more application containers and/or virtual machines to perform techniques described herein.

In some instances, the data center 1000 may provide computing resources, like application containers, VM instances, and storage, on a permanent or an as-needed basis. Among other types of functionality, the computing resources provided by a cloud computing network may be utilized to implement the various services and techniques described above. The computing resources 1004 provided by the cloud computing network can include various types of computing resources, such as data processing resources like application containers and VM instances, data storage resources, networking resources, data communication resources, network services, and the like.

Each type of computing resource 1004 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 1004 not mentioned specifically herein.

The computing resources 1004 provided by a cloud computing network may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations. One illustrative embodiment for a data center 1000 that can be utilized to implement the technologies disclosed herein will be described below with regard to FIG. 11.

The LAN 1008 may be configured to enable connectivity between the server computers 1002 (A-F) and an external wide area network (WAN). In some embodiments, this is accomplished via an edge router 1010 in communication with the LAN 1008. Such an edge router 1010 may use any suitable routing protocols to route communications between the various components depicted.

Figure 11:
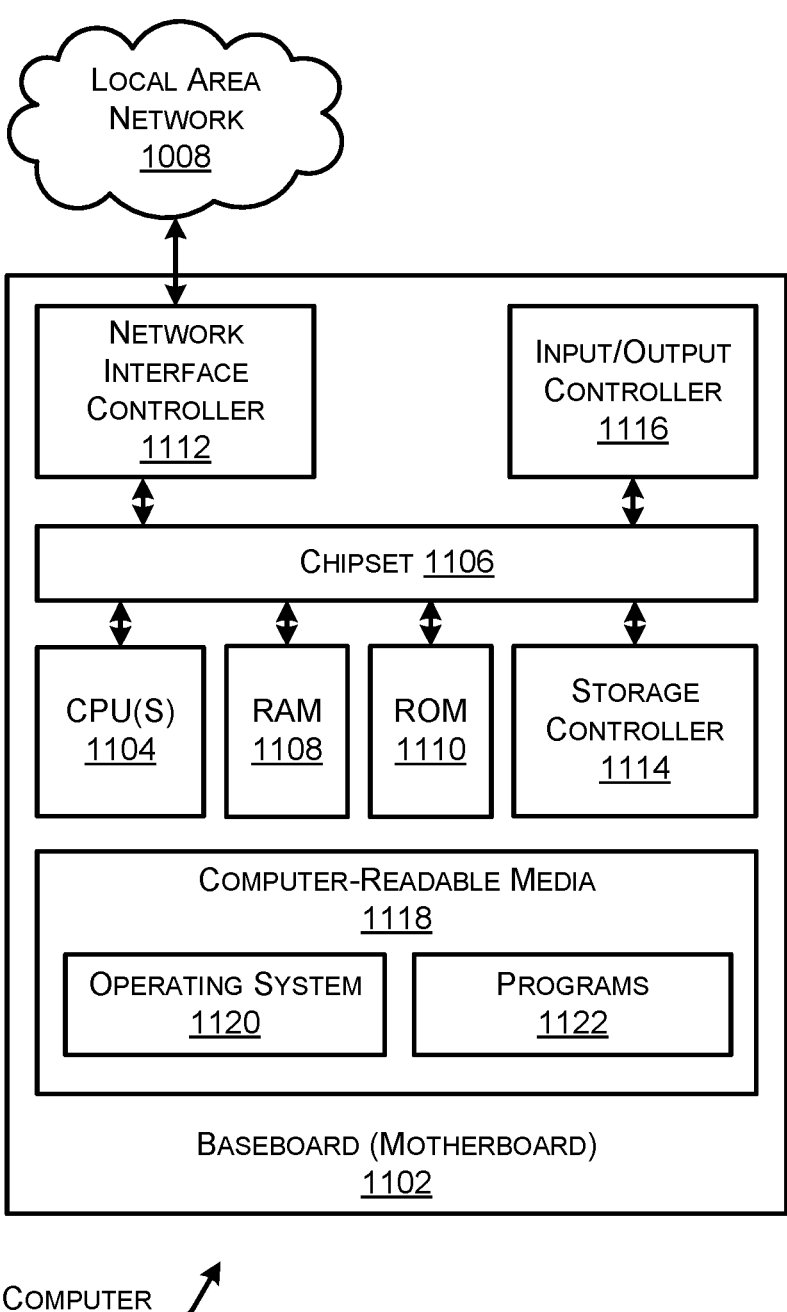
FIG. 11 shows an example computer architecture for a server computer capable of executing program components for implementing the functionality described above.

FIG. 11 shows an example computer architecture for a server computer 1002 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The server computer 1002 may, in some examples, correspond to a physical server as described herein, and may comprise networked devices such as servers, switches, routers, hubs, bridges, gateways, modems, repeaters, access points, etc.

The server computer 1002 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the server computer 1002.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the server computer 1002. The chipset 1106 can further provide an interface to a computer-readable storage medium such as a read-only memory ("ROM") 1110 or non-volatile RAM ("NVRAM") for storing basic routines that help to startup the server computer 1002 and to transfer information between the various components and devices. The ROM 1110 or NVRAM can also store other software components necessary for the operation of the server computer 1002 in accordance with the configurations described herein.

The server computer 1002 can operate in a networked environment using logical connections to remote computing devices and computer systems through a network, such as the LAN 1008. The chipset 1106 can include functionality for providing network connectivity through a NIC 1112, such as a gigabit Ethernet adapter. The NIC 1112 is capable of connecting the server computer 1002 to other computing devices over the LAN 1008 (and/or 102). It should be appreciated that multiple NICs 1112 can be present in the server computer 1002, connecting the computer to other types of networks and remote computer systems.

The server computer 1002 can be connected to a storage device 1118 that provides non-volatile storage for the computer. The storage device 1118 can store an operating system 1120, programs 1122, and data, which have been described in greater detail herein. The storage device 1118 can be connected to the server computer 1002 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 1002 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the server computer 1002 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 1002 can further read information from the storage device 1118 by detecting the physical states or characteristics of one or more particular locations within the physical storage units.

In addition to the mass storage device 1118 described above, the server computer 1002 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 1002. In some examples, the operations performed by devices as described herein may be supported by one or more devices similar to server computer 1002. Stated otherwise, some or all of the operations performed by the edge device 102, and/or any components included therein, may be performed by one or more server computers 1002 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the server computer 1002. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the server computer 1002.

In one embodiment, the storage device 1118 or other computer-readable storage media is encoded with computer-executable instructions which, when loaded into the server computer 1002, transform the computer from a general-purpose computing system into a special-purpose computer capable of implementing the embodiments described herein. These computer-executable instructions transform the server computer 1002 by specifying how the CPUs 1104 transition between states, as described above. According to one embodiment, the server computer 1002 has access to computer-readable storage media storing computer-executable instructions which, when executed by the server computer 1002, perform the various processes described above. The server computer 1002 can also include computer-readable storage media having instructions stored thereupon for performing any of the other computer-implemented operations described herein.

The server computer 1002 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the server computer 1002 might not include all of the components shown in FIG. 11, can include other components that are not explicitly shown in FIG. 8, or might utilize an architecture completely different than that shown in FIG. 11.

As described herein, the server computer 1002 may include one or more hardware processors (e.g., CPU 1104) configured to execute one or more stored instructions. The processor(s) may comprise one or more cores. Further, the server computer 1002 may include one or more network interfaces configured to provide communications between the server computer 1002 and other devices, such as the communications described herein as being performed by the edge device 102. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 800. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 1122 may comprise any type of programs or processes to perform the techniques described in this disclosure. The programs 1122 may comprise any type of program that cause the server computer 1002 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause server computer 1002 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANS (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfied, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

generating, at network node, a set of paths to a destination, a first path of the set of paths being labeled as a direct path and a second path of the set of paths being labeled as an indirect path;

receiving, by the network node, a communication from a source and directed to the destination;

determining, by the network node based on a first indicated path preference for the destination and a second indicated path preference for the source, a path category;

selecting, by the network node, a forwarding path as one of the first path or the second path based on the determined path category; and routing, by the network node, the communication to a next hop in the selected forwarding path.

2. The method of claim 1, wherein an indirect path is selected based on policy data as the forwarding path if either of the first indicated path preference for the destination or the second indicated path preference for the source indicate an indirect path in the policy data.

3. The method of claim 1, wherein a direct path is selected based on policy data as the forwarding path if both of the first indicated path preference for the destination and the second indicated path preference for the source indicate a direct path in the policy data.

4. The method of claim 1, wherein the second path is labeled as an indirect path based on the second path including a second network node associated with one or more transport services that it performs on network traffic.

5. The method of claim 4, wherein the second network node is determined to be associated with one or more transport services by virtue of being included at a site associated with the one or more transport services.

6. The method of claim 4, wherein the second network node is identified based on a classification assigned to it.

7. The method of claim 1, wherein at least one of the source or the destination comprises a user device in communication with the network.

8. A network node device comprising:

one or more processors; and one or more non-transitory computer-readable media storing computer-executable instructions that, when executed by the one or more processors, cause the network node device to perform operations comprising:

generating a set of paths to a destination, a first path of the set of paths being labeled as a direct path and a second path of the set of paths being labeled as an indirect path;

receiving a communication from a source and directed to the destination;

determining, based on a first indicated path preference for the destination and a second indicated path preference for the source, a path category;

selecting a forwarding path as one of the first path or the second path based on the determined path category; and routing the communication to a next hop in the selected forwarding path.

9. The network node device of claim 8, wherein the set of paths comprises a forwarding information base (FIB).

10. The network node device of claim 9, wherein the FIB stores an indication of the next hop.

11. The network node device of claim 8, wherein the first indicated path preference for the destination and the second indicated path preference for the source is obtained from policy data stored on the one or more non-transitory computer-readable media.

12. The network node device of claim 11, wherein the policy data comprises overlay management protocol (OMP) policy data.

13. The network node device of claim 8, wherein the at least one of the source or the destination comprises an application hosted by a service provider.

14. The network node device of claim 13, wherein the service provider comprises a software as a service (SaaS) provider platform.

15. The network node device of claim 8, wherein selecting a forwarding path further comprises selecting the first path or the second path based on additional route selection criteria.

16. The network node device of claim 15, wherein the additional route selection criteria comprises a combination of jitter, latency, or packet loss.

17. One or more non-transitory computer-readable media storing computer-executable instructions that, when executed by one or more processors, cause the one or more processors to perform operations comprising:

generating a set of paths to a destination, a first path of the set of paths being labeled as a direct path and a second path of the set of paths being labeled as an indirect path;

receiving a communication from a source and directed to the destination;

determining, based on a first indicated path preference for the destination and a second indicated path preference for the source, a path category;

selecting a forwarding path as one of the first path or the second path based on the determined path category; and routing the communication to a next hop in the selected forwarding path.

18. The one or more non-transitory computer-readable media of claim 17, wherein the first indicated path preference for the destination and the second indicated path preference for the source is obtained from policy data provided by a controller.

19. The one or more non-transitory computer-readable media of claim 17, wherein the second path is labeled as an indirect path based on one or more transport services associated with the second path.

20. The one or more non-transitory computer-readable media of claim 19, the one or more transport services comprising one or more of implementing a firewall, performing virus scanning, or performing access management.

* * * * *